(No Model.) 6 Sheets—Sheet 3.
J. JOHNSTON & B. B. STEWART.
CORN HUSKING MACHINE.
No. 316,150. Patented Apr. 21, 1885.
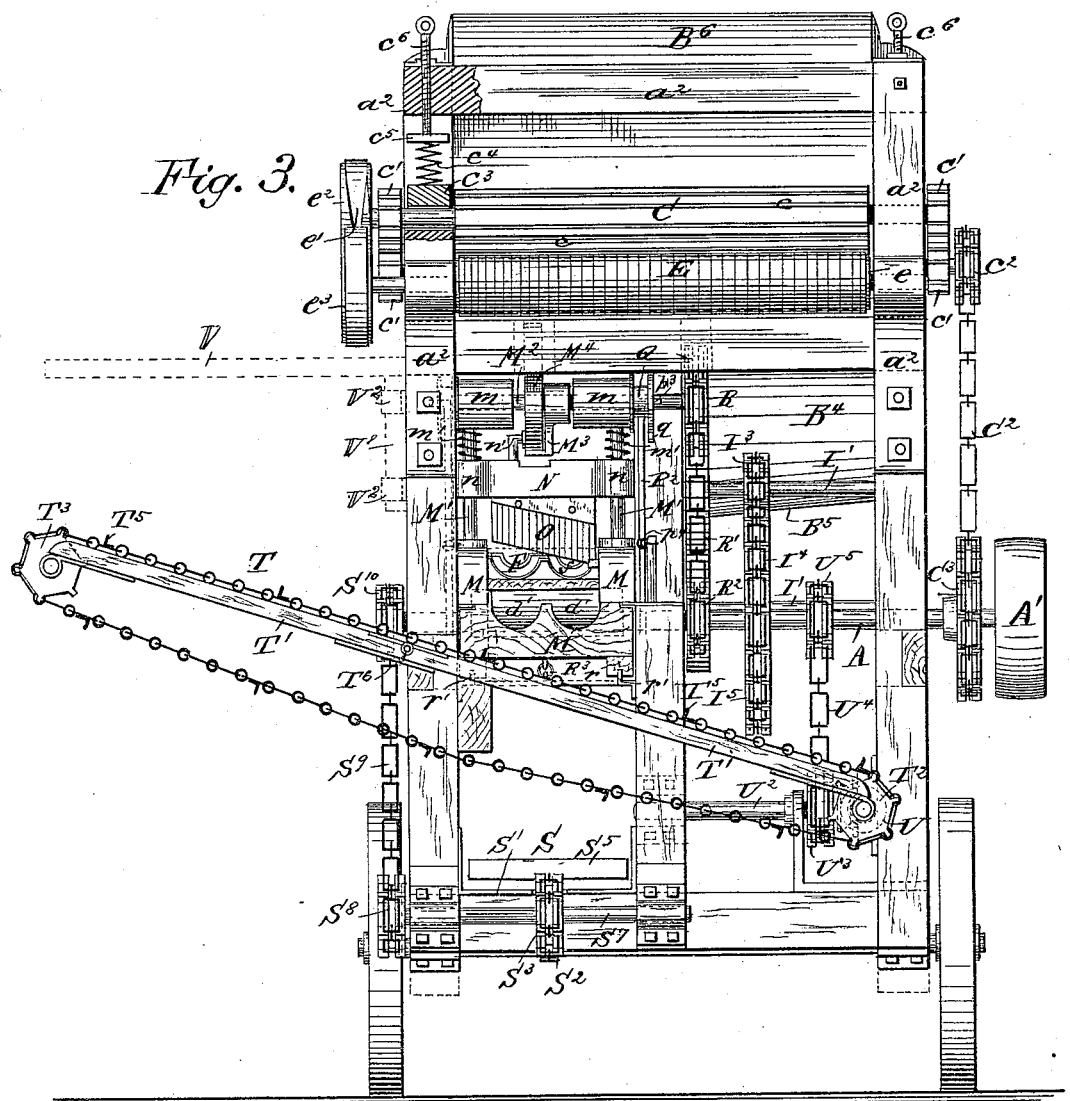
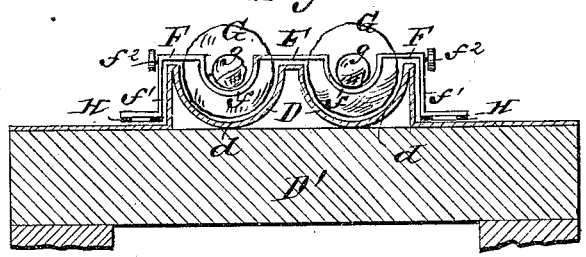
WITNESSES:
INVENTOR:
J. Johnston
B. B. Stewart
BY Munn & Co
ATTORNEYS.

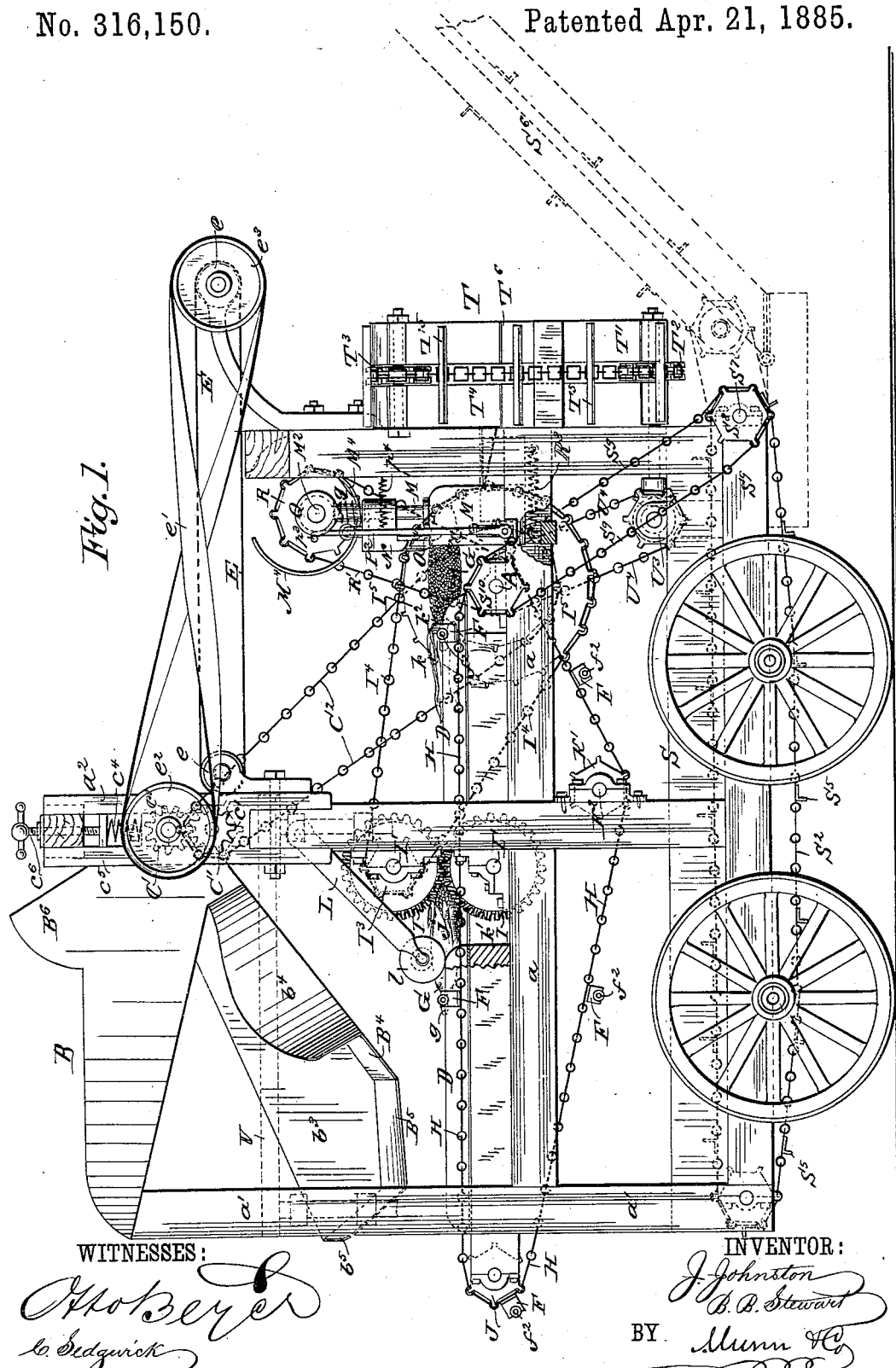

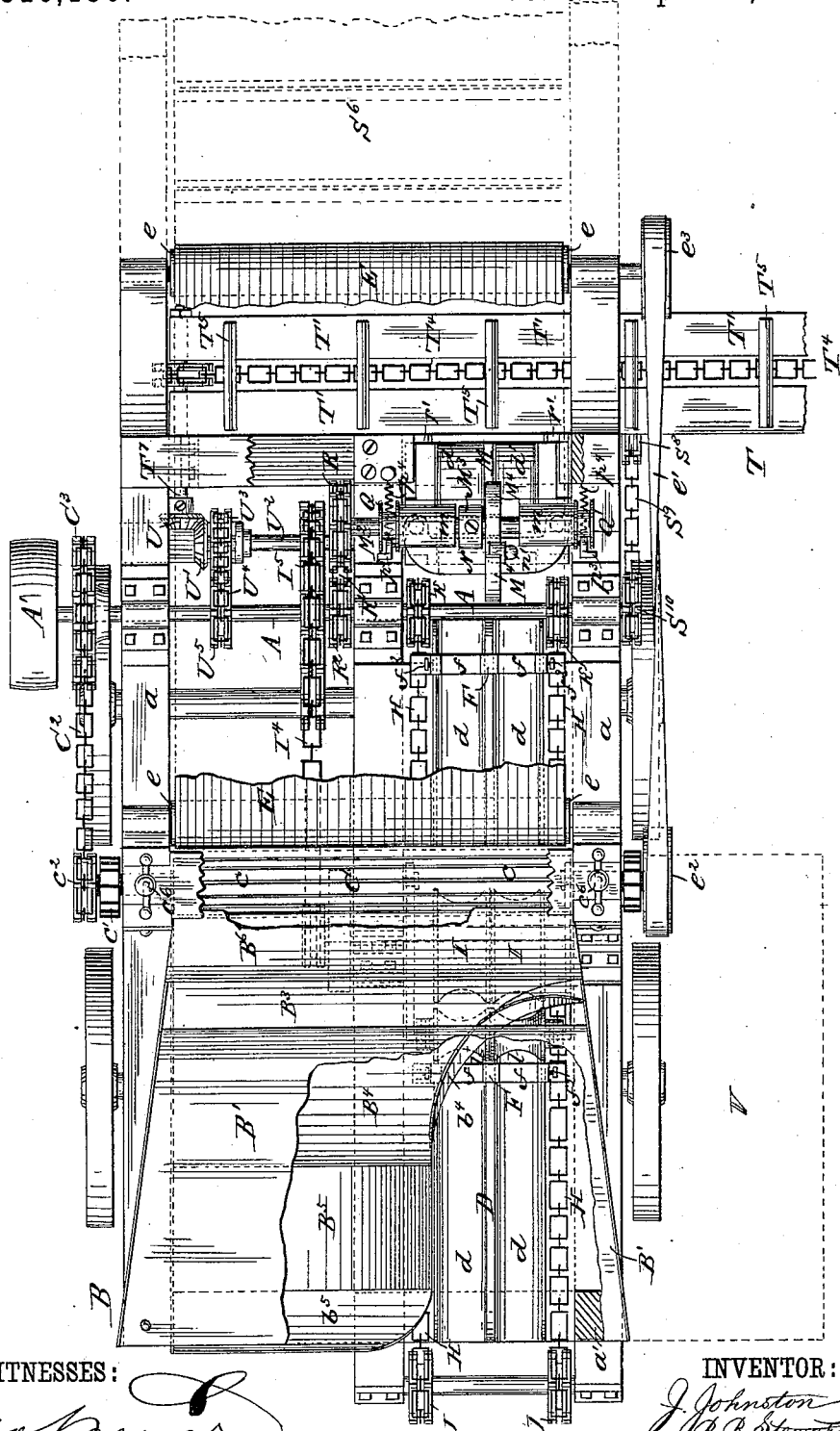

(No Model.) 6 Sheets—Sheet 4.

J. JOHNSTON & B. B. STEWART.
CORN HUSKING MACHINE.

No. 316,150. Patented Apr. 21, 1885.

WITNESSES:
Geo. Beyer
C. Sedgwick

INVENTOR:
J. Johnston
B. B. Stewart
BY Munn & Co.
ATTORNEYS.

(No Model.) 6 Sheets—Sheet 5.

J. JOHNSTON & B. B. STEWART.
CORN HUSKING MACHINE.

No. 316,150. Patented Apr. 21, 1885.

WITNESSES:
Otto Berger
C. Sedgwick

INVENTOR:
J. Johnston
B. B. Stewart
BY Munn & Co
ATTORNEYS.

(No Model.) 6 Sheets—Sheet 6.
J. JOHNSTON & B. B. STEWART.
CORN HUSKING MACHINE.
No. 316,150. Patented Apr. 21, 1885.
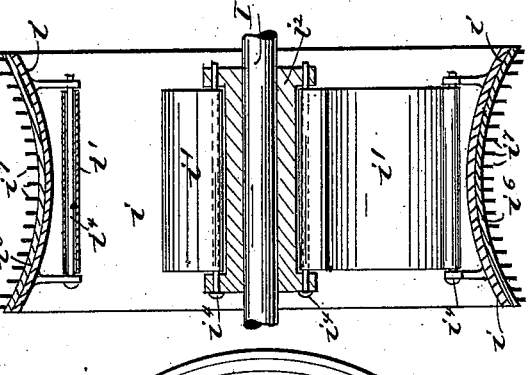
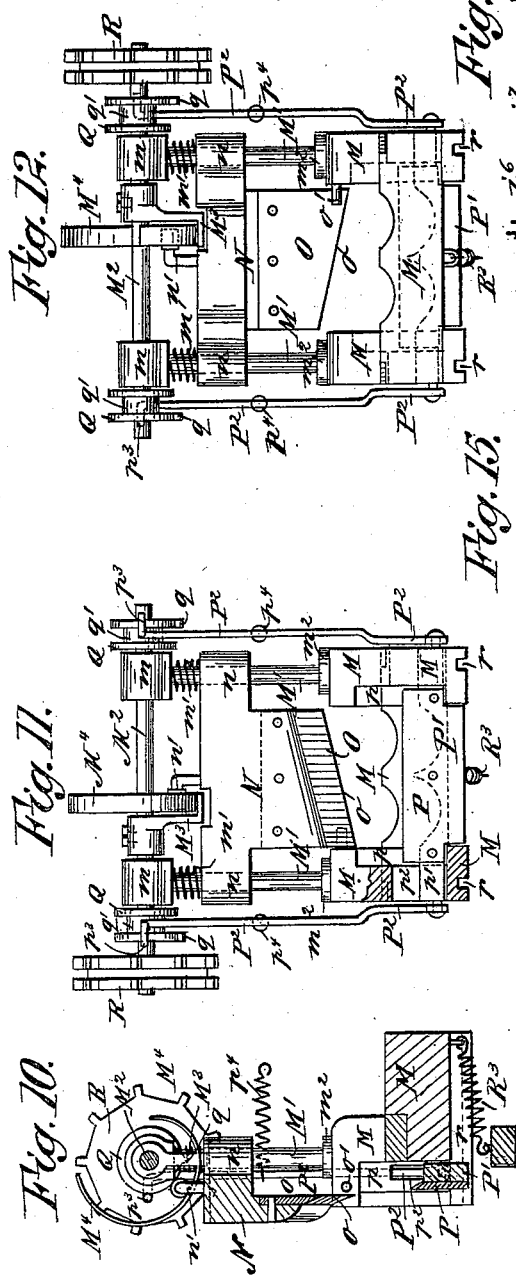
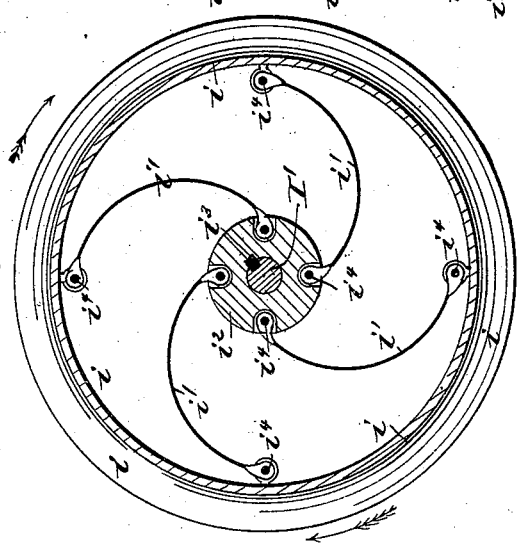
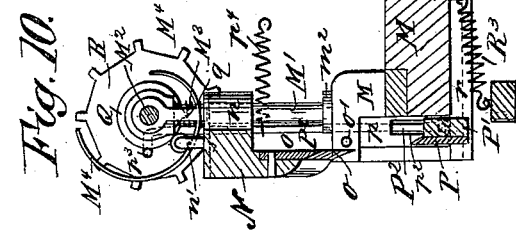
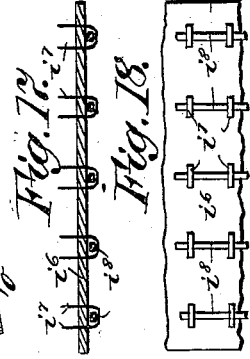
WITNESSES:
INVENTOR:
J. Johnston
B. B. Stewart
BY Munn & Co
ATTORNEYS.

UNITED STATES PATENT OFFICE.

JOHN JOHNSTON AND BURNET B. STEWART, OF ALGONQUIN, ILLINOIS.

CORN-HUSKING MACHINE.

SPECIFICATION forming part of Letters Patent No. 316,150, dated April 21, 1885.

Application filed August 15, 1884. (No model.)

*To all whom it may concern:*

Be it known that we, JOHN JOHNSTON and BURNET BREBNER STEWART, both of Algonquin, in the county of McHenry and State of Illinois, have invented a new and Improved Corn-Husking Machine, of which the following is a full, clear, and exact description.

The object of this invention is to provide an efficient machine for husking corn which has been harvested by severing the stalks and leaving the ears thereon—in other words, corn which has been cut and shocked.

The invention consists in a machine embodying certain constructions and arrangements of mechanism which operate to pull the ears from the stalks as the stalks are fed to the machine, to brush the husks back toward and over the butts of the ears, to sever said butts and husks from the ears, and to discharge the stalks, husks, and husked corn-ears separately, the several mechanisms acting successively and for the most part automatically, so as to do a large amount of work with little labor of attendants, all as hereinafter fully described and claimed.

Reference is to be had to the accompanying drawings, forming part of this specification, in which similar letters of reference indicate corresponding parts in all the figures.

Figure 5:
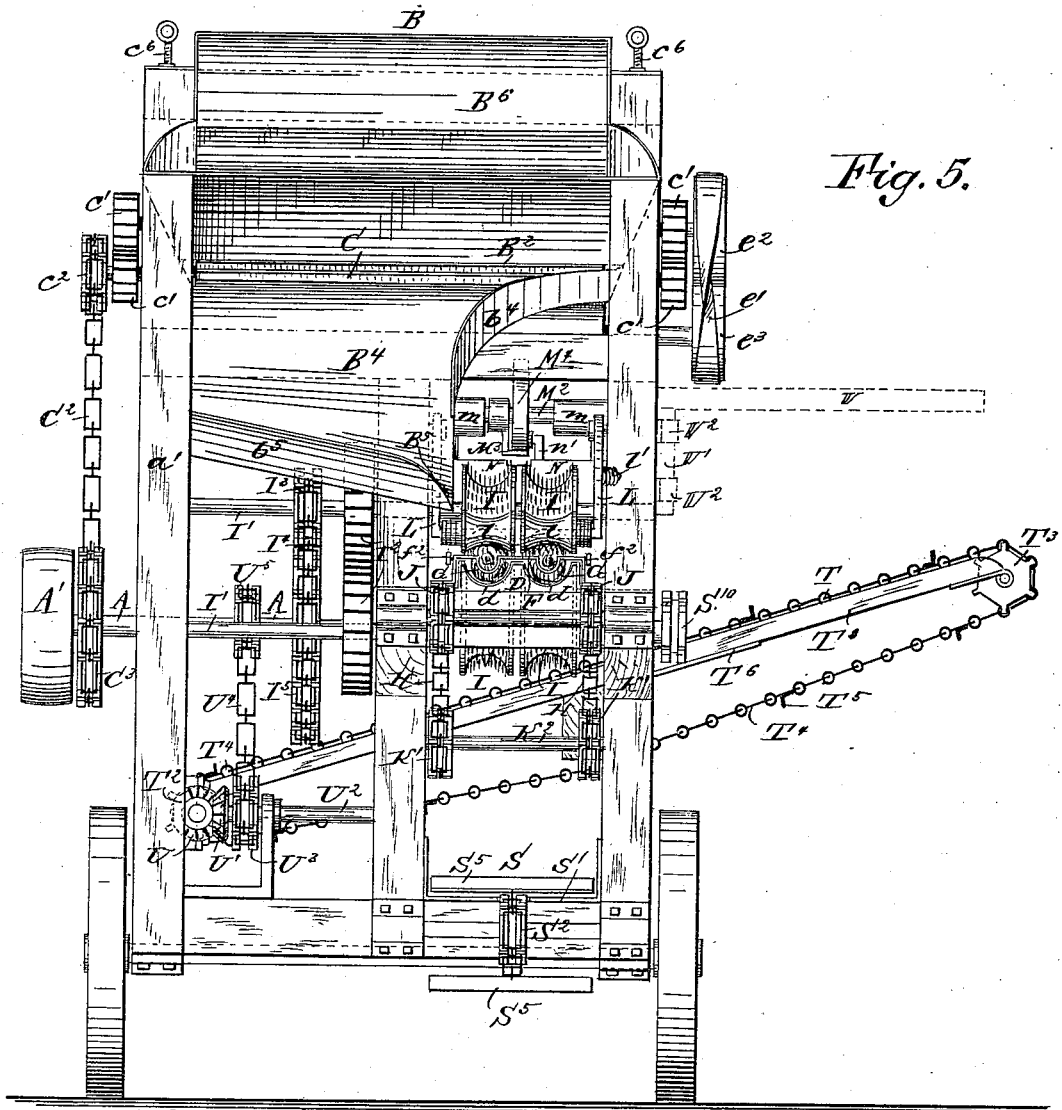
Figures 6, 7:
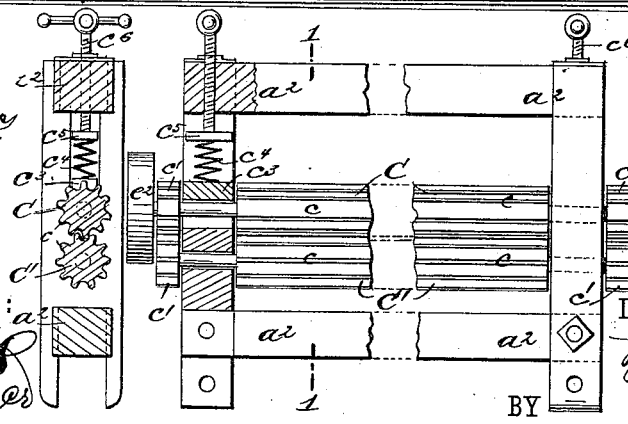
Figure 8:
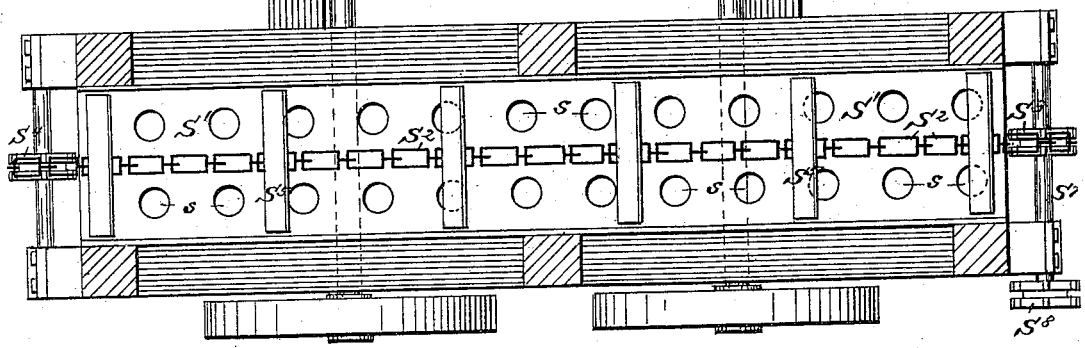
Figure 9:
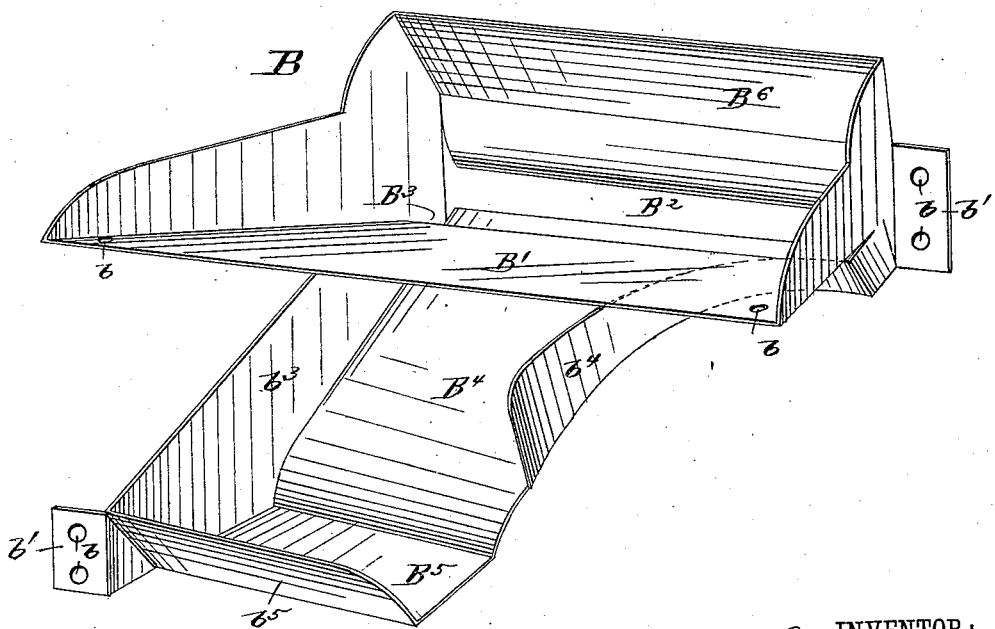

Figure 1 is a side elevation of the husking-machine, partly in section. Fig. 2 is a plan view of the machine, partly broken away. Fig. 3 is a rear end elevation of the machine, partly broken away and in section. Fig. 4 is a cross-sectional elevation of the corn-ear bed and carrier. Fig. 5 is a front end elevation of the machine. Fig. 6 is an elevation of the cornstalk-feed rolls, with part of the machine-frame in section and partly broken away. Fig. 7 is a vertical sectional elevation on the line 1 1, Fig. 6. Fig. 8 is a plan view, with the machine-frame in horizontal section just above the husk-carrier. Fig. 9 is a perspective view of the stalk and ear feeding tables. Fig. 10 is a vertical sectional elevation of the carriage and the knives therein, by which the butts and husks are severed from the ears. Fig. 11 is a front elevation of the knife-carriage, partly in section. Fig. 12 is a rear elevation of the knife-carriage. Fig. 13 is a rear perspective view of the upper knife-bar and knife. Fig. 14 is a like view of the lower knife-bar and knife. Fig. 15 is a central vertical sectional elevation of one of the husking-brushes with the toothed peripheral brush removed. Fig. 16 is a cross-sectional elevation of one of the husking-brushes with the peripheral brush in place, and Figs. 17 and 18 are respectively a section and back view of part of the toothed periphery of one of the brushes.

The various operating mechanisms are supported on a substantial frame of timbers, which is mounted on suitable axles and wheels, as shown, forming a truck by which the machine may easily be transported from place to place.

The letter A indicates the main power or driving shaft of the machine, which is journaled in boxes held to the central horizontal side timbers, $a\ a$, of the frame, and carries a number of chain-wheels, over which driving-chains pass to the various mechanisms employed in the husking process. The shaft A has a pulley, A', to which a belt may pass from any convenient motor for driving the machine.

To the front end timbers, $a'$, of the main frame, and to the frame $a^2$ of the stalk-feed rolls, we fasten, by bolts or screws, the stalk and ear feed table B. (Represented in larger scale in Fig. 9.) This table B has a platform, B', preferably inclining downward and inward toward the stalk-feed rolls C C', to which the stalks pass through a back opening, B², of the table. As the stalks fed along the platform B' are drawn in through the feed-rolls C C' butt-ends first the ears of corn which cannot pass between the rolls are squeezed or torn from the stalk—or, rather, the stalk is pulled from the ears—and the ears fall down in front of the rolls and through an opening, B³, made at about a right angle to the opening B², and through the back end of the platform B'; or, in other words, the platform does not extend to the back end of the feed-table, thereby forming the opening B³, after passing through which the ears drop upon and slide down the lower platform, B⁴, which inclines reversely to the platform B', and connects with a lower platform, B⁵, which inclines downward and laterally from the side wall, $b^3$, of the platform B⁴ and toward the other side of the machine, so as to drop the corn-ears upon the bed D of the ear-carrier, hereinafter fully described.

The platform $B^4$ has also the side flange or wall, $b^4$, which curves downward and inward from the top or inner part of the feed-table for delivering the ears from any point along the rolls C C' to the platform $B^5$, which has a front flange or wall, $b^5$, to prevent escape of the ears except to the carrier-bed D. Holes $b$, made through the platform B' and flanges $b'$, allow the passage of bolts to hold the feed-table B to the machine-frame.

The inner portion of the feed-table may project upward and forward to form a sort of hood, $B^6$, under which the stalks pass.

After the stalks—stripped of the ears—leave the rolls C C', they pass upon the carrier E, to be conveyed thereby clear of the machine. Said carrier E consists of an endless web, of any suitable material, passing around rollers $e$ $e$, which may be driven by a belt, $e'$, leading from a pulley, $e^2$, fixed to the journal of one of the feed-rolls—the roll C, for instance—to a pulley, $e^3$, fixed to one of the carrier-rollers, and the carrier E may be extended to any suitable point from which it is preferred to discharge the stalks to the ground or into any receiver, such as a wagon.

The feed-rolls C C' are made respectively with lengthwise or axial shallow flutes, forming ribs $c$, which extend for the whole length of the rolls, which construction insures the positive feeding of the stalks through the rolls and the easy and certain separation of the ears from the stalks. The shafts or axles of the rolls are journaled in suitable bearings, and have intermeshing gears $c'$ $c'$ at each side of the machine, and one of the shafts carries a chain-wheel, $c^2$, which connects by a chain, $C^2$, with a chain drive-wheel, $C^3$, fixed on the shaft A, so that said chain $C^2$ gives motion from the main shaft A to both the feed-rolls and stalk-carrier.

We prefer to make the frame $a^2$ of the feed-rolls of metal, and to journal the lower roll, C', in fixed bearings of said frame, and to make the bearings for the journals of the upper roll, C, in the lower sides of half-boxes $c^3$, on which rest powerful springs $c^4$, which may be compressed by the foot-blocks $c^5$ of screws $c^6$, threaded into suitable nuts held to the frame, so that by turning the handles of the screws one way or the other the pressure of the rolls on the stalks may be varied as required.

The lower ends of the side posts of the frame $a^2$ may be forked to straddle the main frame of the machine, to which the roll-frame may be held by any suitable bolts or screws.

As the stalks pass through the feed-rolls C C' and leave the corn-ears behind, much of the outer husks are stripped from the ears and pass with the stalks onto the apron E, so that when the ears fall upon the carrier-bed D only the corn-silk and some of the inner parts of husks remain on the ears, and such silk and husks can readily be removed by the action of brushes of suitable construction, as hereinafter described.

The ear-carrier bed D is shown with two longitudinal grooves or channels, $d$ $d$, made preferably by bending sheet-metal plates into the gutter form shown clearly in Fig. 4, and attaching said plates to a suitable bed-plate, D', which ranges lengthwise of the machine. The ear-carriers are made of narrow plates or strips of metal, F, which cross the bed D', and are bent down at the center of each channel $d$ of the bed, to form the notch $f$ above and in the channel, in which notch the butt-end $g$ of the ear G may rest, when so placed by an attendant, while the body of the ear lies in the channel $d$. The edge of the carrier F thus rests against the back end of the ear, so that when the carrier is moved forward by the endless chains H H, to which the opposite bent end parts $f'$ $f'$ of the carrier are attached, the ears will be carried forward to the brushes I I points first, as shown at $j$ in Fig. 1, to have the silk and husks on the ears brushed backward toward the butt, as shown at $k$ in said figure. The carriers F have the rollers $f^2$ journaled to them at each end, so as to come against the face of the knife-carriage to force it back, as hereinafter more fully explained.

The carrier-chains H H—one at each side of the carrier-bed—pass around the chain-wheels J K, mounted, respectively, on shafts journaled at the opposite ends of the bed, and belt-tightening wheels K' are journaled within the said chains, to bear down upon the lower sides of the chains to take up any slack or stretch of the chains, and the bearings of the shaft $K^2$ of the wheel K' will be made vertically adjustable on the machine-frame, to lower the chain-tightening wheels as may be required.

The chain-wheels K at the inner bends of the chains H are mounted directly upon the main driving-shaft A, whereby motion is given to the ear-carrier.

It is evident that the number of channels $d$ in the carrier-bed may be more or less than the two shown and preferred, and that the number of brushes or pairs of brushes I will correspond with the number of channels, each of which will support a separate ear in advance of each carrier F, as will readily be understood.

The brushes I I are mounted in pairs, one above the other, on the upper and lower brush-shafts, I' I', which are journaled in boxes on the frame, and the brush-shafts each have a gear-wheel, $I^2$, which wheels mesh with each other, and one of the shafts carries a chain-wheel, $I^3$, over which a chain, $I^4$, passes to a large chain-wheel, $I^5$, mounted on the main driving-shaft A, whereby swift motion is imparted to the brushes I I, which turn in reverse directions, so as to brush back the husks from the corn-ears passed between them, the peripheries of the brushes being separated sufficiently to allow the ends of the carrier F to pass between them.

The peripheries or rims $i$ of the rotary brushes I are concave, (see Figs. 3, 15, and 16,) so that an oval or approximately-round opening will be formed between each pair of brushes for the ears to pass through; and said rims $i$ connect by springs $i'$ with the hubs $i^2$ of the brushes, which are keyed to the brush-shafts, as at $i^3$. The opposite ends of each spring $i'$ are connected pivotally to the rims $i$ and hubs $i^2$, respectively, as at $i^4$, and from the hubs to the rims the springs are curved reversely to the direction of rotation of the brushes, and the rims are made of any suitable material—such as thin malleable iron or steel—which rims will easily give way or yield bodily with the springs at the points of contact of the brushes with the ears, to allow the ears to pass between the brushes, and the tension of the springs will be regulated so that a pressure sufficient to injure the corn-kernels on the ears or shell the corn will never be brought to bear on the ears, and yet sufficient pressure be exerted to entirely remove the corn silk and husks from ears of any size. It is evident that brushes of this construction accommodate themselves automatically to ears of any size fed indiscriminately to them, so that no time is lost in sorting out or "sizing" the ears before passing them to the brushes.

The brush material with which the brush-rim is covered may be made of any suitable substance; but we prefer to make it of the leather facing $i^6$, having staple-like metal teeth $i^7$ passed through it from the inside, and with rods or wires $i^8$ passed inside of the heads or loops of the staples next the inner side of the facing, as shown in Figs. 17 and 18, so that when the facing-pieces are secured to the rims $i$ the teeth will be firmly held thereto.

There is an opening, $k'$, through the carrier-bed D in front of the lower brush-rolls, I, which project upward through the bed to receive the ears from the carriers, and it is desirable to make this opening $k'$ of sufficient length to allow the lower half of the corn-husks brushed back by the lower brushes to turn back freely; but in making such space at $k'$ quite a wide throat is formed, through which the shorter ears would be liable to drop before the brushes could act on them, and to avoid this we provide the arms L, which are pivoted to the frame-posts at the upper ends, and incline downward and forward, and carry rollers $l$ at their lower ends, which come directly over the channels $d$, so as to rest on the corn-ears as they advance to the brushes, just in front of the opening $k'$, to hold the ears up level until they enter between the brushes. There is an arm, L, provided with a roller, $l$, for each channel $d$, so that each arm acts independently of the other to guide the corn-ears in both channels advanced by the same carrier safely to the brushes.

The arms L may hold their respective rollers $l$ to the ears by gravity; but we prefer to use a suitable elastic band, or a spring, as at $l'$, and attached at opposite ends to the arm L and the frame-post to bear the rollers $l$ down on the ears, as shown in Fig. 1.

The corn-ears, with the husks brushed back, as at $k$, are moved back by the carriers F toward the knives which are to sever the butts $g$ and the husks from the ears at the point $k^2$ at the extreme back ends of the ears.

We will first describe in detail the construction of the knife-carriage and knives, and then their operation relatively to the carrier and the ears for severing the butts and husks from the ears.

The knife-carriage is made with a heavy base piece or plate, M, from which guide-bars M' M' rise vertically, one at each side of the base-piece, and on these bars M' is fitted loosely by its side bearings, $n$ $n$, the heavy knife-bar N, to which is fastened the upper knife, O. At the tops of the bars M' are fixed the bearing-blocks $m$, in which is journaled the shaft M², which has fixed to it an arm, M³, to which is fixed eccentrically the curved strap or band M⁴, which is made in open construction, or with separate ends, so that one end of the eccentric band will pass beneath the cranked arm $n'$, fixed to the knife-bar N, or beneath an anti-friction roller, $n^2$, placed on said arm for lifting the knife O, said arm $n'$ escaping at the other end of the eccentric for letting the knife fall. Springs $m'$ are placed on the guide-bars M' between the heads $m$ and the knife-bar N. The springs are compressed as the knife O rises, and expand when the arm $n'$ escapes from the eccentric to carry the knife down forcibly, and suitable buffers, $m^2$, are placed on the base-piece M, on which the knife-bar N falls to prevent shock and noise.

We prefer to make the knife O with an oblique or inclined edge, $o$, so that it will sever the butts and husks from the ears with a shearing cut, and at the broad end of the knife a pin or stop, $o'$, may be fixed to one of the bracket-arms of the base-piece M as a guide and support to the knife.

P is the lower knife, which is fastened to a bar, P', and fitted to slide in ways $p$ $p$, made in the base-piece, toward and from the upper knife, O. The bar P' has end tenons, $p'$, which pass through vertical slots $p^2$ in the base-piece, to permit the attachment to the ends of the bar P' of the connecting-rods P², which extend upward, and at their tops are provided with lateral arms $p^3$, which lie in the paths of tappets $q$, fixed on collars Q, fixed to the shaft M², so that the revolution of said shaft will at the proper times carry the lower knife upward and let it fall, for purposes presently to be explained. As shown, the upper ends of the rods P² are bent twice at right angles, so that said ends may rest in annular grooves $q'$ of the collars Q, while the arms $p^3$ extend over the outside rims or flanges of the collars, to which the tappets $q$ are fixed. The grooves of the collars Q thus serve as guides to the ends of the rods P², for holding the arms $p^3$ in proper positions to be struck by the tappets.

Springs $p^4$, fixed at opposite ends to the rods $P^2$ and the machine-frame, hold the upper ends of the rods in the grooves $q'$ of the collars.

R is a chain-wheel fixed on the knife-carriage shaft $M^2$, and connecting by a chain belt, $R'$, with a chain-wheel, $R^2$, fixed on the driving-shaft A, whereby motion is transmitted to the shaft $M^2$ to operate both the knives O P.

We arrange the knife-carriage to slide bodily backward and forward or lengthwise of the machine behind the ear-carrier bed D and carrier H F for a limited distance—say about one-half of an inch, (more or less,)—and so that the carriage may be pushed back by the carriers, to avoid clogging the machine by an overpressure or lodgment of the severed corn-ear butts and husks, which would take place between the traveling carrier and an unyielding knife-carriage. As shown, the knife-carriage bed-piece M is grooved, as at $r\ r$, to fit upon slideways $r'\ r'$, fixed to the machine-frame; but the carriage may be arranged to slide in any approved way.

A spring, $R^3$, fixed at opposite ends to the carriage and to the machine-frame, serves to draw the carriage forward again when the severed butts and husks which pass around in front of it have fallen to the husk-carrier S, which conveys them from the machine. The driving chain belt $R'$ has sufficient slackness to allow the sliding movements of the knife-carriage.

The knives operate as follows: As the ears of corn having the husks brushed back approach the knife-carriage the cam or eccentric strap $M^4$ acts to lift the upper knife, O, to allow the ears to pass below and beyond or behind it, and when the carrier has shoved the ears along until the point $k^2$ of severance has come in line with the edges of the knives O P the tappets $q$ act to lift the knife P to that point and against the butts and husks of the ears, and behind the large ends of the ears, so that the ears are prevented from moving backward out of place, and just after or as the knife P has arisen to hold the ears, as described, the arm $n'$ of the knife-head N escapes from the eccentric $M^4$, and the upper knife, O, falls and severs the stem and husks from the ears, the knife O shearing close to the face of the knife P, so that a clean and easy cut is made. The carrier F having advanced sufficiently, its end rollers, $f^2$, act against the knife-carriage to slide it back, to give room for the severed butts and husks to fall below to the carrier S as the carrier F passes around below the bed D, and the husked ears drop on the carriage bed-piece $M'$ and slide down the inclined grooves $d'$ therein onto the carrier T, which elevates the husked corn and discharges it into a receiver—such as a bin or a wagon—at the side of the machine.

The carrier S consists of a bed or floor, $S'$, fixed to the machine-frame, and an endless chain, $S^2$, which runs around chain-wheels $S^3$ $S^4$, and has attached to it a series of scraper-blades, $S^5$, which carry the butts and husks along to the back end of the machine, where they may be discharged to the ground; or, if desired, an extension-carrier (shown in dotted lines at $S^6$ in Figs. 1 and 2) may connect to the carrier S to receive the stuff therefrom and convey it to any point of discharge. A chain-wheel, $S^8$, on the shaft $S^7$ connects by a chain belt, $S^9$, with a chain-wheel, $S^{10}$, on the main driving-shaft A, to give motion to the husk-carrier.

The carriage T, for the husked ears, consists of a bed, $T'$, having chain-wheels $T^2\ T^3$, journaled on shafts at opposite ends, over which wheels passes an endless chain, $T^4$, to which are fixed the blades $T^5$, which carry the ears upward and discharge them from the top of the carrier into a wagon or bin. The carrier-floor T is jointed at $T^6$, so that its upper part may be folded up close to the frame, to allow the machine to be moved about and housed more conveniently.

For operating the carrier T, we fix to the lower chain-wheel, $T^2$, or to its shaft, the bevel-gear U, which meshes with a bevel-gear, $U'$, fixed on a shaft, $U^2$, ranging parallel with the main shaft A. The gear $U'$ has fixed to it, or there is fixed on its shaft $U^2$, the chain-wheel $U^3$, over which a chain belt, $U^4$, passes to a chain-wheel, $U^5$, fixed on the main driving-shaft A.

A platform, V, (shown in dotted lines in Figs. 1, 2, 3, and 5,) will be provided, on which the operator may stand to feed the stalks placed on the platform to the rolls C $C'$, and said platform will be connected to the machine-frame so as easily to be removed—as, for instance, by brackets or arms $V'$ on the platform entering the keepers $V^2$, fixed to the frame. An attendant will also be required to place the ears as they drop from the table B properly upon the bed D, with their butts resting in the notches $f$ of the carriers F. Otherwise the machine is entirely automatic in its action.

Our improved corn-husking machine is capable of doing a large amount of work efficiently and cheaply, and delivers the husked corn in a clean and uninjured condition.

Having thus described our invention, what we claim as new, and desire to secure by Letters Patent, is—

1. In corn-husking machines, the combination, with the ear-carrier, of the feed-table B, constructed with a platform, $B'$, an opening, $B^2$, leading to the rolls C $C'$, an opening, $B^3$, at the rear of the platform $B'$, a downwardly-inclined platform, $B^4$, to receive the corn-ears, and a laterally-extending inclined platform, $B^5$, to discharge the ears to the carrier, substantially as shown and described.

2. The combination, in a corn-husking machine, of the feed-table B, having a platform, $B'$, the stalk-feed rolls C $C'$, the stalk-carrier E, the inclined platforms $B^4\ B^5$ of the feed-table, the husking-brushes, and an ear-carrier placed below the feed-table for receiving the ears and carrying them to the husking-brushes, substantially as shown and described.

3. In a corn-husking machine, the carrier for unhusked ears, comprising a bed, D, having channels or gutters $d$, to receive the ears separately, and carriers F, placed across the bed and formed with notches $f$, to receive the butts of the ears, and means for moving the carriers, substantially as shown and described.

4. In a corn-husking machine, the carrier for unhusked ears, comprising a bed, D, having channels $d$, and carriers F, placed across the bed and formed with notches $f$, to receive the butts of the ears, and a traveling chain or belt, to which said carrier is attached, substantially as shown and described.

5. The combination, with the carrier-bed D, having longitudinal grooves $d\ d$, of the longitudinally-moving ear-carrier F, extending across and down into said grooves $d$, and formed with notches or depressions in its upper surface to receive the stem of the ear, substantially as and for the purpose set forth.

6. The combination, in a corn-husking machine, of brushes arranged in pairs to rotate in opposite direction, with their concave peripheries facing each other, and said peripheries being elastically supported from the interior of the brushes, so as to yield to accommodate themselves to corn-ears of varying size, and means for carrying the ears to and between the brushes, substantially as shown and described.

7. The combination, in a corn-husking machine, of the ear-carrier bed D, having longitudinal grooves $d$, with the carriers F, having depressions or notches $f$ extending across the grooves $d$, to receive the stem of the ear and support its butt, said plates being attached at their ends to endless chains, and the husking-brushes each comprising a rigid rim, a flexible toothed covering therefor, a hub, and an elastic connection between the said rim and hub, substantially as set forth.

8. A rotary brush for corn-husking machines, comprising a concave peripheral bushing rim and face, and means whereby it is supported from the interior of the brush on springs, so as to yield at the point of contact with the corn-ears, substantially as shown and described.

9. A rotary brush for corn-husking machines, comprising a concave peripheral rim and face, a hub, and springs whereby the rim $i$ is supported from the interior, said springs curving from the center of the brush to its periphery in a direction reverse to the direction of rotation of the brush, substantially as shown and described.

10. A rotary brush for corn-husking machines, comprising brush material, a concave rim, $i$, a hub, $i^2$, and springs $i'$, which curve in a direction reverse to the direction of rotation of the brush, said springs being secured to the rim $i$ and hub $i^2$, so as to allow said springs and rim to yield to ears of varying size, substantially as shown and described.

11. In a corn-husking machine, the combination, with the ear-carrier and husking-brushes, of a presser consisting of a pivoted arm, L, and a roller, $l$, to rest on the ears, substantially as shown and described.

12. A corn-husking machine comprising a carrier for the ears, rotary brushes acting to brush the husks back toward and over the stems of the ears, a knife in the path of the carrier, and mechanism for automatically operating the knife to sever the stem and husk when the said carrier has brought the ear adjacent to the knife, substantially as set forth.

13. A corn-husking machine comprising a carrier for the ears, rotary brushes acting to brush the husks back over the butts of the ears, and a knife acting at the end of the carrier to sever the butts and husks from the ears, and a carriage which is fitted to slide to and from the carrier in its supports, substantially as shown and described.

14. A corn-husking machine comprising a carrier for the corn-ears, husking-brushes acting to brush the husks back over the butts of the ears, a knife, and a sliding carriage, said carriage being adapted to be forced back by the ear-carrier as the knife severs the butts and husks from the ear, substantially as shown and described.

15. A corn-husking machine comprising a carrier for the ears, husking-brushes acting to brush the husks back over the butts of the ears, a knife-carriage having a lower sliding knife, means whereby it is caused to rise to the point of severance of the butts and husks from the ears, to prevent back movement of the ears by the carrier, and an upper knife, which falls to sever the butts and husks from the ears, substantially as shown and described.

16. In a corn-husking machine, the knife-carriage constructed with a base-piece, M, standards M', the knife O, the head N, provided with an arm and fitted to slide on the standards, bearings $m\ m$ on the standards, shaft $M^2$, and open eccentric strap or band, $M^4$, which rests on the arm of the knife-head, substantially as shown and described.

17. In a corn-husking machine, the knife-carriage constructed with a base-piece, M, standards M', the knife O, the head N, fitted to slide on the standards, bearings on the standards, the shaft $M^2$, carrying collars Q, with tappets $q$, and devices for lifting the knife O, a lower knife, P, and a head, P', adapted to slide in the base-piece M, and lifting-rods $P^2$, substantially as shown and described.

18. The combination, with the knife-carriage bed-piece M, the knife P, head P', fitted to slide in the bed-piece, and the rods $P^2$, connected to the head P', of the collar Q, fixed on the driving-shaft $M^2$, and provided with tappets $q$ and grooves $q'$, and the heads of the rods $P^2$ being bent twice to enter the grooves $q'$, and extend laterally by arms $p^3$ in the paths of the tappets, substantially as shown and described.

19. The combination, with the knife-head P', shaft $M^2$, grooved collars Q, and connecting-rods $P^2$, attached to the knife-head P', and resting in the grooves $q'$ of the tappet-collars Q, of the springs $p^4$, substantially as herein shown and described.

20. The combination, with the supporting-frame, the ear-carriers, and the knife-carriage fitted to slide to and from the ear-carriers F, which force the knife-carriage backward, of a spring to move the carriage forward, substantially as shown and described.

21. The combination, with the sliding knife-carriage, of the carriers F and the rollers $f^2$, by which the carriage is forced back, substantially as shown and described.

22. In a corn-husking machine, the combination of a carrier for the unhusked ears, rotary brushes acting at opposite sides of the ears to brush the husks back over the butts of the ears, knives acting at the end of said carrier to sever the butts and husks from the ears, a carrier, S, below the knives to convey the severed husks to a point of discharge, and a carrier, T, behind the knife to deliver the husked corn from the machine, substantially as shown and described.

23. A corn-husking machine comprising a feed-table, B, rolls C C', stalk-carrier E, unhusked-ear carrier D F H, brushes I I, acting to brush the husks back over the butts of the ears, knives O P, acting to sever the butts and husks from the ears, a carrier, S, to convey and discharge the severed husks, and a carrier, T, behind the knife to deliver the husked corn from the machine, all constructed and adapted to operate substantially as shown and described.

JOHN JOHNSTON.
BURNET B. STEWART.

Witnesses:
ELMER A. FORD,
HENRY LEESEBERG.